US012781671B2

(12) United States Patent
Cooling et al.

(10) Patent No.: US 12,781,671 B2
(45) Date of Patent: Nov. 3, 2026

(54) SPEED MATCHING LOW SPOOL GENERATOR TRANSMISSION

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US); Sean Friel, Rockford, IL (US); Tyler W. Hayes, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 301 days.

(21) Appl. No.: 18/759,072

(22) Filed: Jun. 28, 2024

(65) Prior Publication Data

US 2026/0002473 A1 Jan. 1, 2026

(51) Int. Cl.
*F16H 61/682* (2006.01)
*F02C 7/32* (2006.01)

(52) U.S. Cl.
CPC ............. *F02C 7/32* (2013.01); *F16H 61/682* (2013.01); *F05D 2220/76* (2013.01)

(58) Field of Classification Search
CPC ...... F16H 61/682; F02C 7/32; F05D 2220/76; B60W 10/08; B60W 10/11
See application file for complete search history.

(56) References Cited

U.S. PATENT DOCUMENTS

2007/0265761 A1 11/2007 Dooley et al.
2013/0025406 A1* 1/2013 Lemmers, Jr. ............ F02C 7/36 74/650
2018/0112599 A1* 4/2018 Dalal ..................... B64D 33/00
2021/0388733 A1 12/2021 Valois et al.
2022/0352836 A1 11/2022 Hayes et al.
2024/0025555 A1 1/2024 Zatorski et al.

FOREIGN PATENT DOCUMENTS

EP 1959114 A2 * 8/2008 ................ F02C 7/32
EP 2728141 A2 * 5/2014 ................ F02C 3/10

* cited by examiner

*Primary Examiner* — Edwin A Young

(57) ABSTRACT

An apparatus includes a generator including an input shaft, a jet engine including a low pressure spool, and a multi-speed transmission mechanically coupling the low pressure spool to the input shaft. The apparatus further includes a transmission controller configured to disengage an electrical load from the generator, while the electrical load is disengaged from the generator, perform a shifting operation of the multi-speed transmission, and after performing the shifting operation, reengage the electrical load to the generator.

20 Claims, 4 Drawing Sheets

SPEED MATCHING LOW SPOOL GENERATOR TRANSMISSION

TECHNICAL FIELD

This disclosure generally relates to generators. More specifically, this disclosure relates to apparatuses and methods for a speed matching low spool generator transmission.

BACKGROUND

A typical jet engine includes a high pressure spool (high spool) and a low pressure spool (low spool). Over the operating range of the jet engine, the high spool rotates in a relatively narrow speed range, and the low spool rotates in a wider speed range compared to the high spool. Typical electrical generators are designed to operate in a relatively narrow speed range. While an electrical generator can be designed that operates in a relatively wide speed range, this involves tradeoffs, such as increased generator size and complexity, lower efficiency, etc. Because generators designed for narrow operating speed ranges tend to be lighter and more efficient, generators designed to be powered by a jet engine are typically designed for coupling with the high spool to take advantage of the narrow operating speed range of the high spool.

SUMMARY

This disclosure relates to apparatuses and methods for a speed matching low spool generator transmission.

In some embodiments, an apparatus includes a generator including an input shaft, a jet engine including a low pressure spool, and a multi-speed transmission mechanically coupling the low pressure spool to the input shaft. The apparatus further includes a transmission controller configured to disengage an electrical load from the generator, while the electrical load is disengaged from the generator, perform a shifting operation of the multi-speed transmission, and after performing the shifting operation, reengage the electrical load to the generator.

Any single one or any combination of the following features may be used with the various embodiments. The multi-speed transmission may include a sliding clutch, and to perform the shifting operation the transmission controller may be further configured to slide the sliding clutch between a first position corresponding with a first transmission speed and a second position corresponding with a second transmission speed. The transmission controller may be further configured to determine that the shifting operation is indicated based on an operating speed of the low pressure spool and an operating speed of the input shaft, and the electrical load may be disengaged based on the determination that the shifting operation is indicated. To perform the shifting operation, the transmission controller may be further configured to disengage the multi-speed transmission from a currently selected transmission gear to a neutral mode, while the multi-speed transmission is in the neutral mode, match an operating speed of the input shaft to a target speed associated with an operating speed of an alternate transmission gear, and after matching the operating speed of the input shaft to the target speed, engage the multi-speed transmission to the alternate transmission gear. The generator may be a generator/motor, and to match the operating speed of the input shaft to the target speed, the transmission controller may be further configured to operate the generator/motor in a motor mode to turn the input shaft at the target speed. The target speed may fall within a range of the operating speed of the alternate transmission gear, and the transmission may include a mechanical synchronizer assembly configured to match the operating speed of the input shaft to the operating speed of the alternate transmission gear during engaging of the multi-speed transmission with the alternate transmission gear. To perform the shifting operation, the transmission controller may be further configured to disengage the multi-speed transmission from a currently selected transmission gear and engage the multi-speed transmission with an alternate transmission gear, and the multi-speed transmission may include a mechanical synchronizer assembly configured to match an operating speed of the input shaft to an operating speed of the alternate transmission gear during the engaging of the multi-speed transmission with the alternate transmission gear.

In other examples, a method includes disengaging an electrical load from a generator including an input shaft mechanically coupled to a low pressure spool of a jet engine via a multi-speed transmission, while the electrical load is disengaged from the generator, performing a shifting operation of the multi-speed transmission, and after performing the shifting operation, reengaging the electrical load to the generator.

Any single one or any combination of the following features may be used with the various embodiments. The method may further include determining, that the shifting operation is indicated based on an operating speed of the low pressure spool and an operating speed of the input shaft, wherein the electrical load is disengaged based on the determination that the shifting operation is indicated. The method may further include disengaging the multi-speed transmission from a currently selected transmission gear to a neutral mode, while the multi-speed transmission is in the neutral mode, matching an operating speed of the input shaft to a target speed associated with an operating speed of an alternate transmission gear, and after matching the operating speed of the input shaft to the target speed, engaging the multi-speed transmission to the alternate transmission gear. The generator may be a generator/motor, and matching the operating speed of the input shaft to the target speed may include operating the generator/motor in a motor mode to turn the input shaft at the target speed. The target speed may fall within a range of the operating speed of the alternate transmission gear, and the multi-speed transmission may include a mechanical synchronizer assembly configured to match the operating speed of the input shaft to the operating speed of the alternate transmission gear during engaging of the transmission to the alternate transmission gear. The shifting operation may include disengaging the multi-speed transmission from a currently selected transmission gear and engaging the multi-speed transmission with an alternate transmission gear, and the multi-speed transmission may include a mechanical synchronizer assembly configured to match an operating speed of the input shaft to an operating speed of the alternate transmission gear during the engaging of the multi-speed transmission with the alternate transmission gear. The method may be performed by a transmission controller.

In still other examples, a transmission controller includes a memory, and a processor operably coupled to the memory. The processor is configured to disengage an electrical load from a generator including an input shaft mechanically coupled to a low pressure spool of a jet engine via a multi-speed transmission, while the electrical load is disengaged from the generator, perform a shifting operation of the multi-speed transmission, and after performing the shifting operation, reengage the electrical load to the generator.

Any single one or any combination of the following features may be used with the various embodiments. The processor may be further configured to determine that the shifting operation is indicated based on an operating speed of the low pressure spool and an operating speed of the input shaft, and the electrical load is disengaged based on the determination that the shifting operation is indicated. To perform the shifting operation, the processor may be further configured to disengage the multi-speed transmission from a currently selected transmission gear to a neutral mode, while the multi-speed transmission is in the neutral mode, match an operating speed of the input shaft to a target speed associated with an operating speed of an alternate transmission gear, and after matching the operating speed of the input shaft to the target speed, engage the multi-speed transmission to the alternate transmission gear. The generator may be a generator/motor, and to match the operating speed of the input shaft to the target speed, the processor may be further configured to operate the generator/motor in a motor mode to turn the input shaft at the target speed. The target speed may fall within a range of the operating speed of the alternate transmission gear, and the multi-speed transmission may include a mechanical synchronizer assembly configured to match the operating speed of the input shaft to the operating speed of the alternate transmission gear during engaging of the multi-speed transmission to the alternate transmission gear. To perform the shifting operation, the processor may be further configured to disengage the multi-speed transmission from a currently selected transmission gear and engage the multi-speed transmission with an alternate transmission gear, and the multi-speed transmission may include a mechanical synchronizer assembly configured to match an operating speed of the input shaft to an operating speed of the alternate transmission gear during the engaging of the multi-speed transmission with the alternate transmission gear.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1A through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, generators designed to be powered by a jet engine are typically designed for coupling with the high spool to take advantage of the narrow operating speed range of the high spool. Higher efficiency from the jet engine may be achieved by coupling the generator to the low spool. However, a conventional generator designed to operate over the wider speed range of the low spool incurs performance penalties such as additional generator weight, decreased generator efficiency, etc. To allow for a generator design that operates in a narrower speed range than the speed range of the low spool, the generator can be coupled to the low spool with a transmission. However, this requires shifting of the transmission while the generator is under load. Transmissions that can withstand the physical strain of shifting while the generator is under load are mechanically complex and heavy, which may negate any efficiencies of a system where the generator is coupled to the high spool rather than the low spool.

To overcome the issues described above, the present application provides various techniques for removing the load from the generator, and speed matching the generator during a shifting process while load is removed from the generator. This allows for use of a transmission design that is less complex, and therefore lighter in weight, allowing for increased efficiency, decreased size, etc. of the overall system.

Figure 1A:
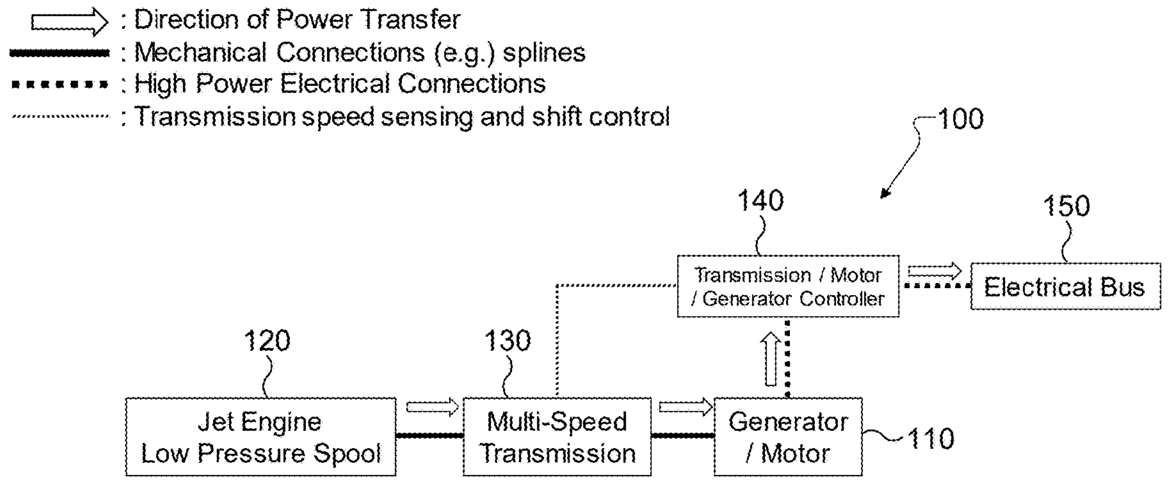
FIGS. 1A-1B illustrate operating modes of an example system for generating power in accordance with this disclosure.
Figure 1B:
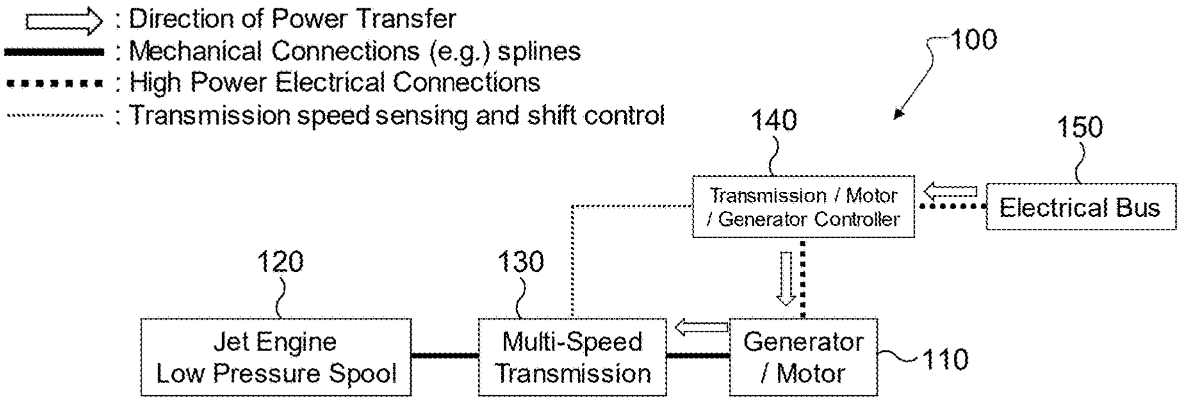

FIGS. 1A-1B illustrate operating modes of an example system 100 for generating power in accordance with this disclosure. As shown in FIGS. 1A-1B, the system 100 includes a generator/motor 110. Generator/motor 110 is a hybrid device, that can operate in a generator mode or an electric motor mode. While operating in generator mode, generator/motor 110 may convert mechanical power provided to the generator by spinning its input shaft into electrical power. While operating in motor mode, generator/motor 110 may be supplied with electrical power, which may cause the input shaft of generator/motor 110 to turn, thereby operating as an output shaft. Generator/motor 110 is mechanically coupled to a jet engine low pressure spool 120 via a multi-speed transmission 130. A transmission/motor/generator controller 140 controls an operating mode of multi-speed transmission 130, as well as the operating mode of generator/motor 110. While transmission/motor/generator controller 140 controls both multi-speed transmission 130 and generator/motor 110, for brevity transmission/motor/generator controller 140 may be referred to as a transmission controller. Transmission controller 140 further controls the flow of electricity between electrical bus 150 and generator/motor 110. Transmission controller 140 may for example, be an electronic device comprising a processor, memory containing a program to operate transmission controller 140, and various other supporting components necessary to control the operation of multi-speed transmission 130 and generator/motor 110 as described herein. However, it should be understood that transmission controller 140 is not limited to a particular embodiment, and that transmission controller 140 may comprise multiple electronic devices, include additional components, may be implemented mechanically rather than electronically, etc.

In FIG. 1A, system 100 is operating in a power generation mode. In the power generating mode, the jet engine low pressure spool 120 is turning at an operating speed, and an input shaft of generator/motor 110 is turning at an operating speed proportional to the operating speed of the low pressure spool 120 according to a currently selected transmission gear of multi-speed transmission 130. For example, the currently selected transmission gear of multi-speed transmission 130 may correspond to one of gear positions 202 or 204 illustrated in FIGS. 2A and 2C. The currently selected transmission gear is selected so that generator/motor 110 operates within generator/motor 110's designed speed range. Due to the turning of the input shaft of generator/motor 110 by the low pressure spool 120, generator/motor 110 produces electrical power which flows onto electrical bus 150.

As the speed of low pressure spool 120 increases or decreases over time, transmission controller 140 may determine that generator/motor 110 may perform better at a different operating speed than the present operating speed. For example, transmission controller 140 may determine, that a shifting operation is indicated based on an operating speed of low pressure spool 120 and an operating speed of the input shaft of generator/motor 110. To facilitate the shifting operation, transmission controller 140 may disengage generator/motor 110 from any current electrical loads. This may reduce strain on multi-speed transmission 130 and generator/motor 110 during the shifting operation, allowing multi-speed transmission 130 and generator/motor 110 to be implemented with a simpler design, lighter design, etc.

After disengaging generator/motor 110 from any electrical loads, transmission controller 140 may perform the shifting operation. The shifting operation may include disengaging the multi-speed transmission 130 from a currently selected transmission gear (e.g., gear position 202 of FIG. 2A) to a neutral mode (e.g., neutral mode as illustrated in FIG. 2B), while the multi-speed transmission is in the neutral mode, matching an operating speed of the input shaft of generator/motor 110 to a target speed associated with an operating speed of an alternate transmission gear, and after matching the operating speed of the input shaft to the target speed, engaging the multi-speed transmission to the alternate transmission gear (e.g., gear position 204 of FIG. 2C). For example, the target speed may match an operating speed of the alternate transmission gear, or the target speed may fall within a range of the operating speed of the alternate transmission gear. Matching the speed of the input shaft to the target speed may reduce strain on the multi-speed transmission 130 and generator/motor 110 during the shifting operation, allowing multi-speed transmission 130 and generator/motor 110 to be implemented with a simpler design, lighter design, etc.

In FIG. 1B, system 100 is operating during a transmission shifting operation. In the transmission shifting mode, jet engine low pressure spool 120 is turning at an operating speed, and a transmission clutch of multi-speed transmission 130 is disengaged. For example, multi-speed transmission 130 may be in a neutral mode as illustrated in FIG. 2B. While the transmission clutch is disengaged, transmission controller 140 may operate generator/motor 110 in motor mode to match the operating speed of the input shaft to the target speed. To facilitate operating in motor mode, generator/motor 110 may draw power from electrical bus 150.

Although FIGS. 1A-1B illustrate one example of a system 100 for generating power, various changes may be made to FIGS. 1A-1B. For example, system 100 may have a direct electrical path between generator/motor 110 and electrical bus 150, transmission controller 140 may control components other than multi-speed transmission 130 and generator/motor 110, etc. Also, while shown here as being used to generate electricity, system 100 can be used in any number of other ways depending on the application. For example, when operating in motor mode, generator/motor 110 can provide mechanical power to drive low pressure spool 120 when multi-speed transmission 130 is engaged.

Figure 2A:
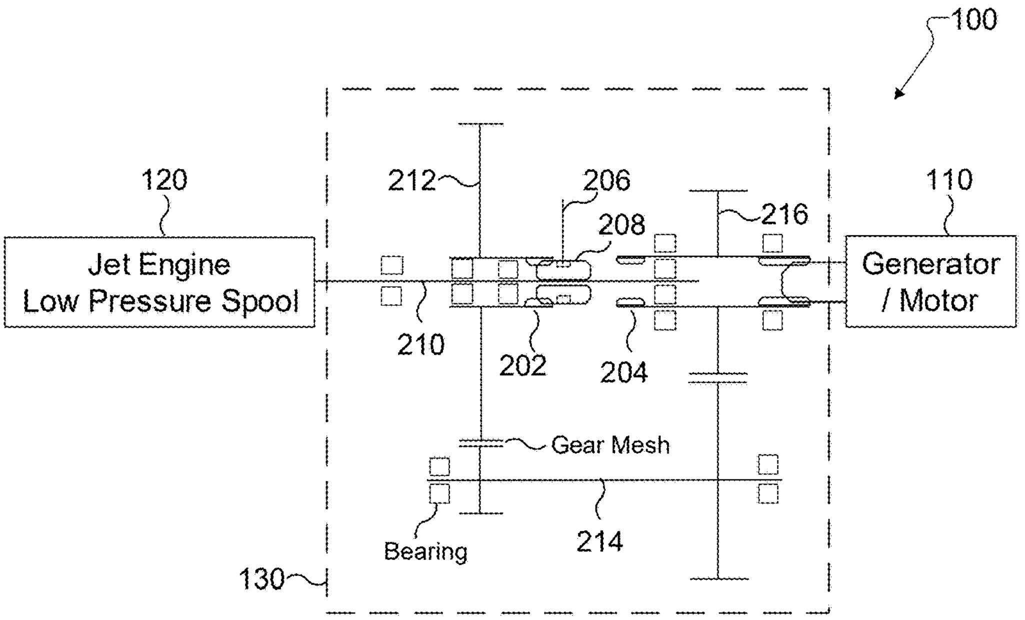
FIGS. 2A-2C illustrate operating modes of a multi-speed transmission in an example system for generating power in accordance with this disclosure.
Figure 2B:
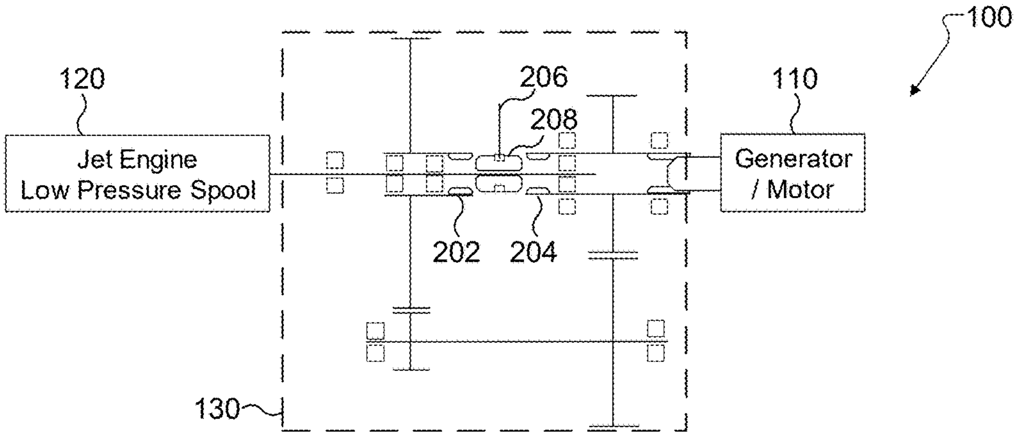
Figure 2C:
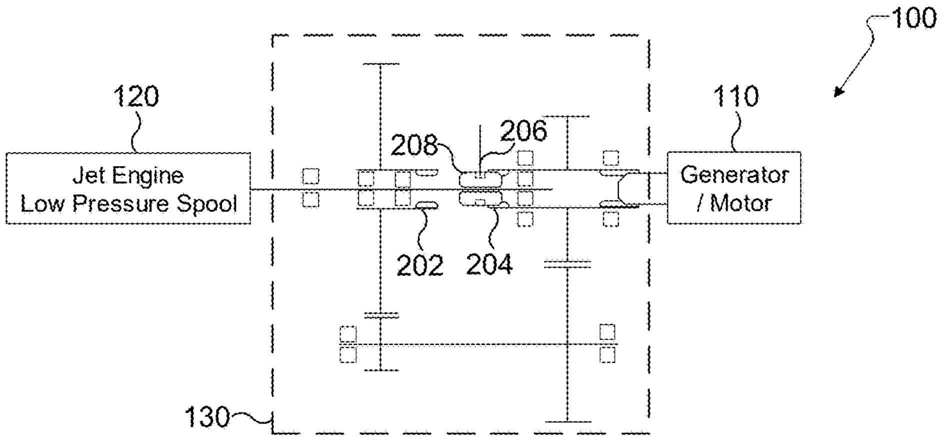

FIGS. 2A-2C illustrate operating modes of a multi-speed transmission 130 in an example system 100 for generating power in accordance with this disclosure. The example of FIGS. 2A-2C shows system 100 as illustrated in FIGS. 1A-1B, but certain components shown in FIGS. 1A-1B are omitted for simplicity. FIGS. 2A-2C show various components of multi-speed transmission 130 including first gear position 202, second gear position 204, shift fork 206, sliding clutch 208, input shaft 210, gear shaft 212, countershaft 214, output shaft 216, and various bearings and gear meshes.

In the example of FIG. 2A, sliding clutch 208 is engaged with first gear position 202. That is to say, in the example of FIG. 2A, first gear is selected for multi-speed transmission 130. While first gear is selected, low pressure spool 120 may provide mechanical power to generator/motor 110 by way of gear shaft 212, countershaft 214, output shaft 216 via the various gear meshes between gear shaft 212, countershaft 214, output shaft 216. Alternatively, while first gear is selected, generator/motor 110 may provide mechanical power to low pressure spool 120 when generator/motor 110 is operating in motor mode. While first gear is selected, first gear may be disengaged by operation of shift fork 206, which may slide sliding clutch 208 to a neutral position as shown in FIG. 2B.

In the example of FIG. 2B, sliding clutch 208 is in a neutral position that is not engaged with first gear position 202 or second gear position 204. That is to say, in the example of FIG. 2B multi-speed transmission 130 is in neutral mode. While in neutral mode, low pressure spool 120 and generator/motor 110 are mechanically disengaged, and the operation of low pressure spool 120 has no effect on generator/motor 110. Similarly, while in neutral mode, the operation of generator/motor 110 has no effect on low pressure spool 120. While in neutral mode, operation of shift fork 206 may select either second gear by moving sliding clutch 208 into second gear position 204 as shown in FIG. 2C, or first gear by moving sliding clutch 208 into first gear position 202 as shown in FIG. 2A.

In the example of FIG. 2C, sliding clutch 208 is engaged with second gear position 204. That is to say, in the example of FIG. 2C, second gear is selected for multi-speed transmission 130. While second gear is selected, low pressure spool 120 may provide mechanical power to generator/motor 110 by way of gear shaft 212 directly interfacing with the input shaft of generator/motor 110. While second gear is selected, countershaft 214, output shaft 216 and the various gear meshes between gear shaft 212 countershaft 214, output shaft 216 are bypassed. Alternatively, while second gear is selected, generator/motor 110 may provide mechanical power to low pressure spool 120 when generator/motor 110 is operating in motor mode. While second gear is selected, second gear may be disengaged by operation of shift fork 206, which may slide sliding clutch 208 to a neutral position as shown in FIG. 2B.

Although FIGS. 2A-2C illustrate one example of operating modes of a multi-speed transmission 130, various changes may be made to FIGS. 2A-2C. For example, system while multi-speed transmission 130 is shown as including a sliding clutch and shift fork type gear selector, any type of clutch mechanism and gear selection mechanism may be used. Furthermore, while shown as a two speed transmission with a particular mechanical configuration, multi-speed transmission 130 may include any number of gears, and may be implemented with any type of mechanical configuration.

Figure 3:
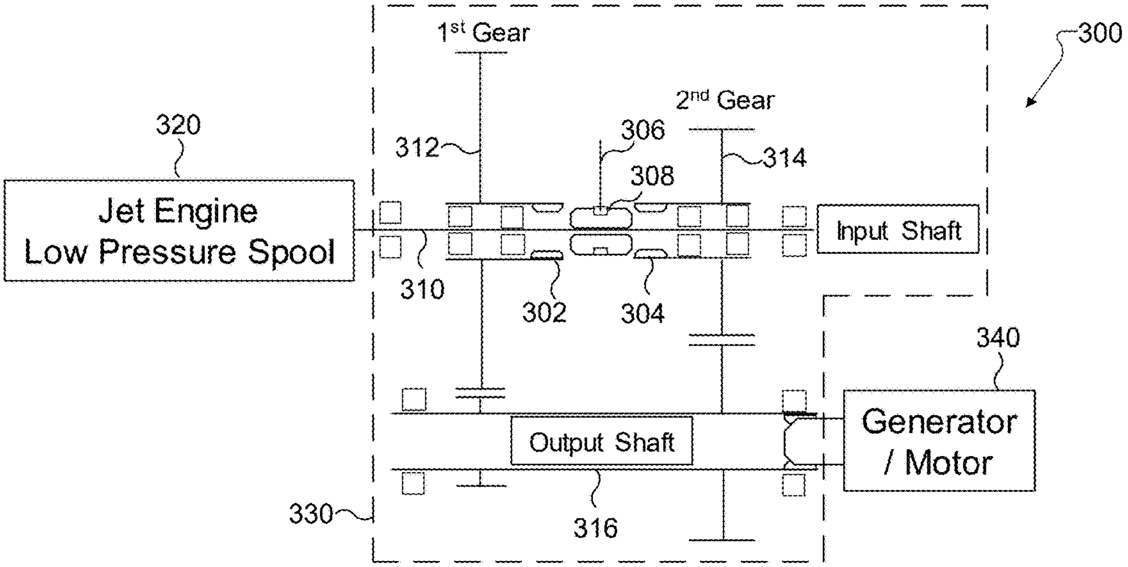
FIG. 3 illustrates another example system for generating power in accordance with this disclosure.

FIG. 3 illustrates another example system 300 for generating power in accordance with this disclosure. The example of FIG. 3 shows system 300 which is similar to system 100 as illustrated in FIGS. 1A-1B and FIGS. 2A-2C, except that system 300 includes a multi-speed transmission 330 having a different mechanical design than multi-speed transmission 130. FIG. 3 shows various components of multi-speed transmission 330 including first gear position 302, second gear position 304, shift fork 306, sliding clutch 308, input shaft 310, gear shaft first 312, second gear shaft 314, output shaft 316, and various bearings and gear meshes.

Multi-speed transmission 330 operates similarly to multi-speed transmission 130 as described in FIGS. 2A-2C, except that the mechanical arrangements of the components provides a different drive mechanism and may provide different gearing ratios from multi-speed transmission 130. While first gear is selected, low pressure spool 320 may provide mechanical power to generator/motor 340 by way of first gear shaft 312 and output shaft 316 via the various gear meshes between first gear shaft 312, and output shaft 216. While first gear is selected, second gear shaft 314 is bypassed. Alternatively, while first gear is selected, generator/motor 340 may provide mechanical power to low pressure spool 320 when generator/motor 340 is operating in motor mode. While first gear is selected, first gear may be disengaged by operation of shift fork 306, which may slide sliding clutch 308 to a neutral position.

While in neutral mode, low pressure spool 320 and generator/motor 340 are mechanically disengaged, and the operation of low pressure spool 320 has no effect on generator/motor 340. Similarly, while in neutral mode, the operation of generator/motor 340 has no effect on low pressure spool 320. While in neutral mode, operation of shift fork 306 may select either second gear by moving sliding clutch 308 into second gear position 304, or first gear by moving sliding clutch 308 into first gear position 302.

While second gear is selected, low pressure spool 320 may provide mechanical power to generator/motor 340 by way of second gear shaft 314 and output shaft 316 via the various gear meshes between second gear shaft 314, and output shaft 216. While second gear is selected, first gear shaft 312 is bypassed. Alternatively, while first gear is selected, generator/motor 340 may provide mechanical power to low pressure spool 320 when generator/motor 340 is operating in motor mode. While first gear is selected, first gear may be disengaged by operation of shift fork 306, which may move sliding clutch 308 to a neutral position.

Although FIG. 3 illustrates one example system 300 for generating power, various changes may be made to FIG. 3. For example, system while multi-speed transmission 330 is shown as including a sliding clutch and shift fork type gear selector, any type of clutch mechanism and gear selection mechanism may be used. Furthermore, while shown as a two speed transmission with a particular mechanical configuration, multi-speed transmission 330 may include any number of gears, and may be implemented with any type of mechanical configuration.

Figure 4:
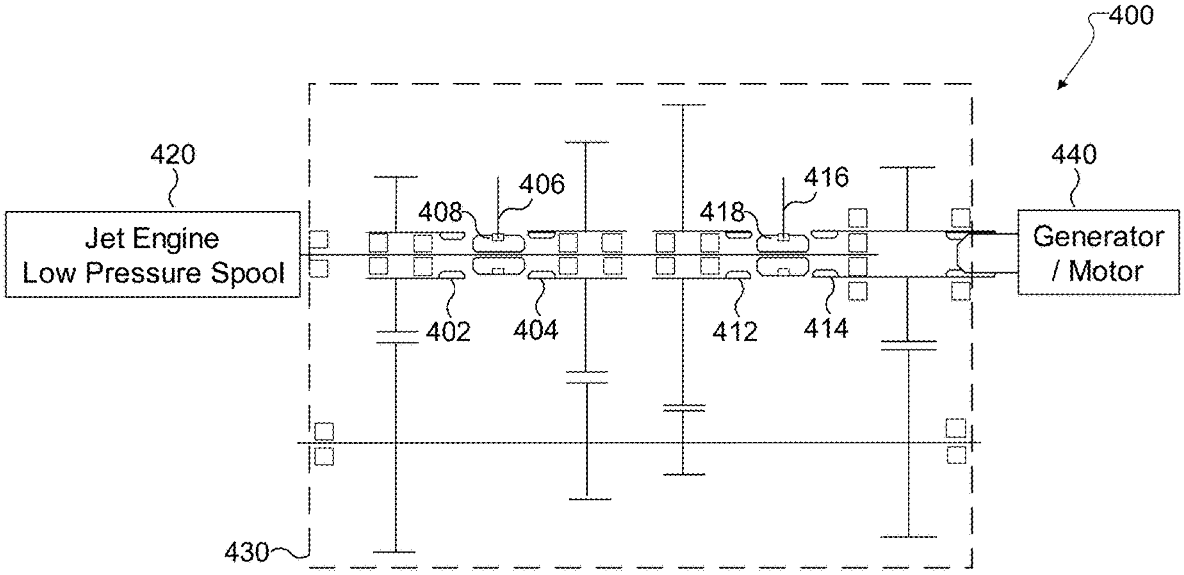
FIG. 4 illustrates another example system for generating power in accordance with this disclosure.

FIG. 4 illustrates another example system 400 for generating power in accordance with this disclosure. The example of FIG. 4 shows system 400 which is similar to system 100 as illustrated in FIGS. 1A-1B and FIGS. 2A-2C, except that system 400 includes a multi-speed transmission 430 having a different mechanical design than multi-speed transmission 130. FIG. 4 shows various components of multi-speed transmission 430 including first gear position 402, second gear position 404, first shift fork 406, first sliding clutch 408, third gear position 412, fourth gear position 414, second shift fork 416, second sliding clutch 418, and various shafts, bearings, and gear meshes.

Multi-speed transmission 430 operates similarly to multi-speed transmission 130 as described in FIGS. 2A-2C, except that the mechanical arrangements of the components provide a different drive mechanism and may provide different gearing ratios from multi-speed transmission 130. Additionally, due to the additional gear positions, sliding clutch, and selector fork, more speed options are available utilizing transmission 430 based on the various gear selections made via first shift fork 406 and second shift fork 416. For example, transmission 430 has four available gear ratios and one neutral position (when both clutches are disengaged) depending on the current positions of first sliding clutch 408 and second sliding clutch 418.

Although FIG. 4 illustrates one example system 400 for generating power, various changes may be made to FIG. 4. For example, system while multi-speed transmission 430 is shown as including sliding clutches and shift fork type gear selectors, any type of clutch mechanism and gear selection mechanism may be used. Furthermore, while shown as a four speed transmission with a particular mechanical configuration, multi-speed transmission 330 may include any number of gears, and may be implemented with any type of mechanical configuration.

While system 100 includes generator/motor 110, and the speed matching of system 100 is accomplished by operating generator/motor 110 in a motor mode, speed matching may also be accomplished with a typical generator that does not have a motor mode ability. For example, the transmission may include a mechanical synchronizer that speed matches the generator to the transmission during the shifting operation.

Figure 5:
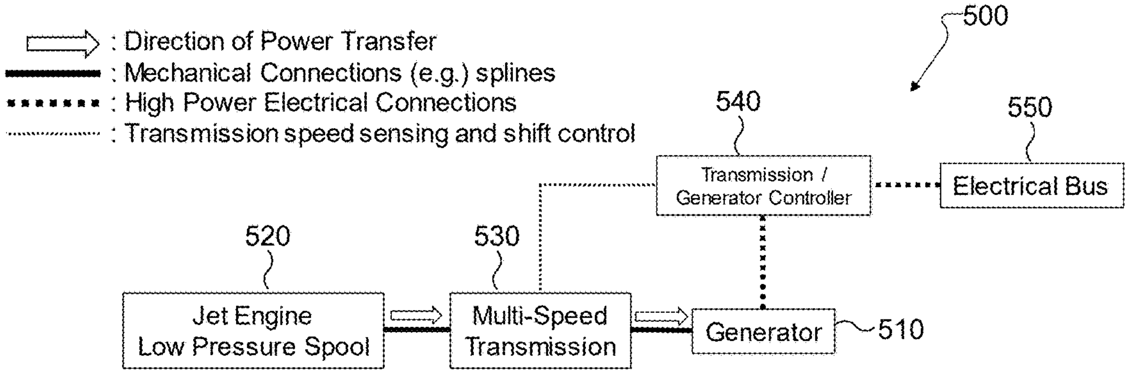
FIG. 5 illustrates an operating mode of another example system for generating power in accordance with this disclosure.
Figure 6:
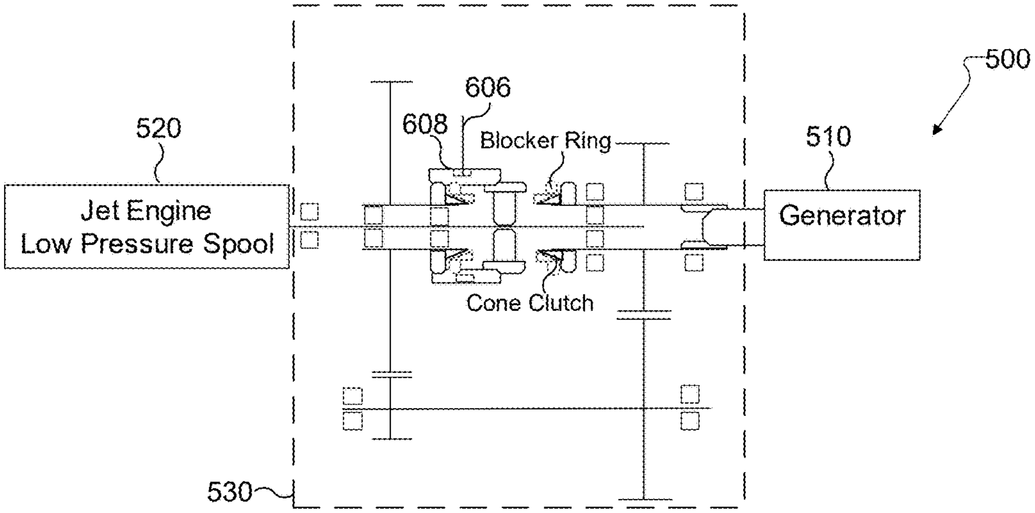
FIG. 6 illustrates mechanical details of multi-speed transmission in an example system for generating power accordance with this disclosure.

FIG. 5 illustrates an operating mode of another example system 500 for generating power in accordance with this disclosure. As shown in FIG. 5, the system 500 includes a generator 510. Generator 510 is a typical generator that may produce electrical power by turning an input shaft of generator 510. Generator 510 does not include the motor capability of generator/motor 110. Generator 510 is mechanically coupled to a jet engine low pressure spool 520 via a multi-speed transmission 530. A transmission/motor/generator controller 540 controls an operating mode of multi-speed transmission 530, as well as the operating mode of generator 510. While transmission/motor/generator controller 540 controls both multi-speed transmission 530 and generator 510, for brevity transmission/motor/generator controller 540 may be referred to as a transmission controller. Transmission controller 540 further controls the flow of electricity between electrical bus 550 and generator 510. Transmission controller 540 may for example, be an electronic device comprising a processor, memory containing a program to operate transmission controller 540, and various other supporting components necessary to control the operation of multi-speed transmission 530 and generator 510 as described herein. Multi-speed transmission 530 is similar to multi-speed transmission 130, except that multi-speed transmission 530 includes a mechanical synchronizer assembly as shown in FIG. 6. Operation of system 500 is similar as described regarding system 100, except that generator 510 may not provide mechanical power to low pressure spool 520.

In FIG. 5, system 500 is operating during a transmission shifting operation. In the transmission shifting mode, jet engine low pressure spool 520 is turning at an operating speed, and a transmission clutch of multi-speed transmission 530 is engaged, but generator 510 is disengaged from any electrical loads. For example, multi-speed transmission 530 may be in the process of engaging an alternative gear from a previously selected gear, and the mechanical synchronizer assembly is speed matching generator 510 to the speed of the selected gear.

Although FIG. 5 illustrates one example of a system 500 for generating power, various changes may be made to FIG. 5. For example, system 500 may have a direct electrical path between generator 510 and electrical bus 550, transmission controller 540 may control components other than multi-speed transmission 530 and generator/motor 510, etc.

FIG. 6 illustrates system 500 with mechanical details of multi-speed transmission 530 in accordance with this disclosure. The example of FIG. 6 shows system 500 as illustrated in FIG. 5, but certain components shown in FIG. 5 are omitted for simplicity. FIG. 5 shows various components of multi-speed transmission 530 including shift fork 606, sliding clutch 608, and various shafts, bearings and gear meshes. Multi-speed transmission 530 is identical in operation to multi-speed transmission 130 except that multi-speed transmission 530 further includes a mechanical synchronizer assembly comprised of blocker rings and cone clutches. During a shifting operation, the mechanical synchronizer assembly speed matches the input shaft of generator 610 to the speed of the selected gear while the selected gear is engaged.

Although FIG. 6 illustrates one example system 500 for generating power, various changes may be made to FIG. 6. For example, system while multi-speed transmission 530 is shown as including a sliding clutch and shift fork type gear selector, and a cone clutch type mechanical synchronizer assembly, any type of clutch mechanism, gear selection mechanism, and mechanical synchronizer assembly may be used. Furthermore, while shown as a two speed transmission with a particular mechanical configuration, multi-speed transmission 530 may include any number of gears, and may be implemented with any type of mechanical configuration.

While system 100 includes generator/motor 110, and the speed matching of system 100 is accomplished by operating generator/motor 110 in a motor mode, speed matching may be improved by including a mechanical synchronizer that speed matches generator/motor 110 to the transmission during the shifting operation similarly as described regarding system 500. For example, when operating in motor mode, generator/motor 110 may not be able to perfectly speed match the selected gear of the transmission. In this situation, the addition of a mechanical synchronizer assembly to multi-speed transmission 130 may provide additional speed matching capability during the shifting operation as shown in FIG. 7.

Figure 7:
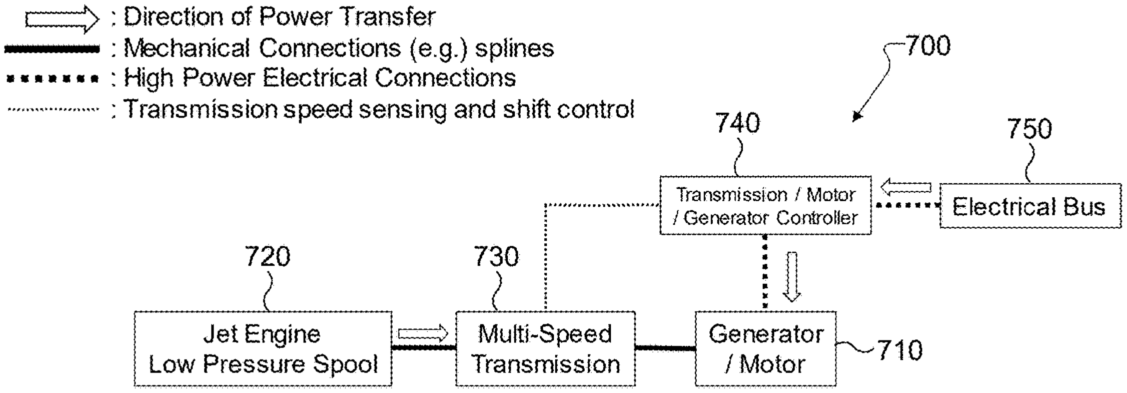
FIG. 7 illustrates an operating mode of another example system for generating power in accordance with this disclosure.

FIG. 7 illustrates an operating mode of an example system 700 for generating power in accordance with this disclosure. As shown in FIG. 7, the system 700 includes a generator/motor 710. Generator/motor 710 is a hybrid device, that can operate in a generator mode or an electric motor mode. While operating in generator mode, generator/motor 710 may produce electrical power by turning an input shaft of generator/motor 710. While operating in motor mode, generator/motor 710 may be supplied with electrical power, which may cause the input shaft of generator/motor 710 to turn, thereby operating as an output shaft. Generator/motor 710 is mechanically coupled to a jet engine low pressure spool 720 via a multi-speed transmission 730. A transmission/motor/generator controller 740 controls an operating mode of multi-speed transmission 730, as well as the operating mode of generator/motor 710. While transmission/motor/generator controller 740 controls both multi-speed transmission 730 and generator/motor 710, for brevity transmission/motor/generator controller 740 may be referred to as a transmission controller. Transmission controller 140 further controls the flow of electricity between electrical bus 150 and generator/motor 110. Transmission controller 740 may for example, be an electronic device comprising a processor, memory containing a program to operate transmission controller 740, and various other supporting components necessary to control the operation of multi-speed transmission 730 and generator/motor 710 as described herein. In the example of FIG. 7 multi-speed transmission 730 is identical to multi-speed transmission 530 of FIG. 5 and FIG. 6. Operation of system 700 is similar as described regarding system 100.

In FIG. 7, system 700 is operating during a transmission shifting operation. In the transmission shifting mode, jet engine low pressure spool 720 is turning at an operating speed, and a transmission clutch of multi-speed transmission 730 is engaged, but power is not being transferred to generator/motor 710, which is operating in motor mode to match the operating speed of the input shaft to a target speed. For example, a blocking ring in the mechanical synchronizer assembly may be blocking engagement of the selected gear while mechanical synchronizer assembly is further speed matching generator/motor 710 with the speed of the selected gear.

Although FIG. 7 illustrates one example of a system 700 for generating power, various changes may be made to FIG. 7. For example, system 700 may have a direct electrical path between generator 710 and electrical bus 750, transmission controller 740 may control components other than multi-speed transmission 730 and generator/motor 510, etc. Furthermore, while multi-speed transmission 730 is described as having a particular configuration, multi-speed transmission 730 may have any configuration.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a generator including an input shaft;

a multi-speed transmission configured to mechanically couple a low pressure spool of a jet engine to the input shaft; and a transmission controller configured to:

disengage an electrical load from the generator;

while the electrical load is disengaged from the generator, perform a shifting operation of the multi-speed transmission; and after performing the shifting operation, reengage the electrical load to the generator.

2. The apparatus of claim 1, wherein:

the multi-speed transmission includes a sliding clutch, and to perform the shifting operation the transmission controller is further configured to slide the sliding clutch between a first position corresponding with a first transmission speed and a second position corresponding with a second transmission speed.

3. The apparatus of claim 1, wherein:

the transmission controller is further configured to determine that the shifting operation is indicated based on an operating speed of the low pressure spool and an operating speed of the input shaft; and the electrical load is disengaged based on the determination that the shifting operation is indicated.

4. The apparatus of claim 1, wherein to perform the shifting operation, the transmission controller is further configured to:

disengage the multi-speed transmission from a currently selected transmission gear to a neutral mode;

while the multi-speed transmission is in the neutral mode, match an operating speed of the input shaft to a target speed associated with an operating speed of an alternate transmission gear; and after matching the operating speed of the input shaft to the target speed, engage the multi-speed transmission to the alternate transmission gear.

5. The apparatus of claim 4, wherein:

the generator is a generator/motor; and to match the operating speed of the input shaft to the target speed, the transmission controller is further configured to operate the generator/motor in a motor mode to turn the input shaft at the target speed.

6. The apparatus of claim 5, wherein:

the target speed falls within a range of the operating speed of the alternate transmission gear; and the transmission includes a mechanical synchronizer assembly configured to match the operating speed of the input shaft to the operating speed of the alternate transmission gear during engaging of the multi-speed transmission with the alternate transmission gear.

7. The apparatus of claim 1, wherein:

to perform the shifting operation, the transmission controller is further configured to:

disengage the multi-speed transmission from a currently selected transmission gear; and engage the multi-speed transmission with an alternate transmission gear; and the multi-speed transmission includes a mechanical synchronizer assembly configured to match an operating speed of the input shaft to an operating speed of the alternate transmission gear during the engaging of the multi-speed transmission with the alternate transmission gear.

8. A method comprising:

disengaging an electrical load from a generator including an input shaft configured to mechanically couple a low pressure spool of a jet engine to the input shaft via a multi-speed transmission;

while the electrical load is disengaged from the generator, performing a shifting operation of the multi-speed transmission; and after performing the shifting operation, reengaging the electrical load to the generator.

9. The method of claim 8, further comprising:

determining, that the shifting operation is indicated based on an operating speed of the low pressure spool and an operating speed of the input shaft, wherein the electrical load is disengaged based on the determination that the shifting operation is indicated.

10. The method of claim 8, wherein the shifting operation comprises:

disengaging the multi-speed transmission from a currently selected transmission gear to a neutral mode;

while the multi-speed transmission is in the neutral mode, matching an operating speed of the input shaft to a target speed associated with an operating speed of an alternate transmission gear; and after matching the operating speed of the input shaft to the target speed, engaging the multi-speed transmission to the alternate transmission gear.

11. The method of claim 10, wherein:

the generator is a generator/motor; and matching the operating speed of the input shaft to the target speed comprises operating the generator/motor in a motor mode to turn the input shaft at the target speed.

12. The method of claim 11, wherein:

the target speed falls within a range of the operating speed of the alternate transmission gear; and the multi-speed transmission includes a mechanical synchronizer assembly configured to match the operating speed of the input shaft to the operating speed of the alternate transmission gear during engaging of the transmission to the alternate transmission gear.

13. The method of claim 8, wherein:

the shifting operation comprises:

disengaging the multi-speed transmission from a currently selected transmission gear; and engaging the multi-speed transmission with an alternate transmission gear; and the multi-speed transmission includes a mechanical synchronizer assembly configured to match an operating speed of the input shaft to an operating speed of the alternate transmission gear during the engaging of the multi-speed transmission with the alternate transmission gear.

14. The method of claim 8, wherein the method is performed by a transmission controller.

15. A transmission controller comprising:

a memory; and a processor operably coupled to the memory, the processor configured to:

disengage an electrical load from a generator including an input shaft configured to mechanically couple a low pressure spool of a jet engine via a multi-speed transmission;

while the electrical load is disengaged from the generator, perform a shifting operation of the multi-speed transmission; and after performing the shifting operation, reengage the electrical load to the generator.

16. The transmission controller of claim 15, wherein:

the processor is further configured to determine that the shifting operation is indicated based on an operating speed of the low pressure spool and an operating speed of the input shaft; and the electrical load is disengaged based on the determination that the shifting operation is indicated.

17. The transmission controller of claim 15, wherein to perform the shifting operation, the processor is further configured to:

disengage the multi-speed transmission from a currently selected transmission gear to a neutral mode;

while the multi-speed transmission is in the neutral mode, match an operating speed of the input shaft to a target speed associated with an operating speed of an alternate transmission gear; and after matching the operating speed of the input shaft to the target speed, engage the multi-speed transmission to the alternate transmission gear.

18. The transmission controller of claim 17, wherein:

the generator is a generator/motor; and to match the operating speed of the input shaft to the target speed, the processor is further configured to operate the generator/motor in a motor mode to turn the input shaft at the target speed.

19. The transmission controller of claim 18, wherein:

the target speed falls within a range of the operating speed of the alternate transmission gear; and the multi-speed transmission includes a mechanical synchronizer assembly configured to match the operating speed of the input shaft to the operating speed of the alternate transmission gear during engaging of the multi-speed transmission to the alternate transmission gear.

20. The transmission controller of claim 15, wherein:

to perform the shifting operation, the processor is further configured to:

disengage the multi-speed transmission from a currently selected transmission gear; and engage the multi-speed transmission with an alternate transmission gear; and the multi-speed transmission includes a mechanical synchronizer assembly configured to match an operating speed of the input shaft to an operating speed of the alternate transmission gear during the engaging of the multi-speed transmission with the alternate transmission gear.

* * * * *